US012683442B2

(12) United States Patent (10) Patent No.: US 12,683,442 B2
Tonari et al. (45) Date of Patent: Jul. 14, 2026

(54) ELECTRIC MOTOR

(71) Applicant: DAIKIN INDUSTRIES, LTD., Osaka (JP)

(72) Inventors: Tatsuya Tonari, Osaka (JP); Hisato Sumitomo, Osaka (JP); Yuji Nakazawa, Osaka (JP); Taiichi Nose, Osaka (JP); Hirofumi Higashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 417 days.

(21) Appl. No.: 17/464,509

(22) Filed: Sep. 1, 2021

(65) Prior Publication Data

US 2021/0399597 A1 Dec. 23, 2021

Related U.S. Application Data

(63) Continuation of application No. PCT/JP2020/012123, filed on Mar. 18, 2020.

(30) Foreign Application Priority Data

Mar. 27, 2019 (JP) ................................. 2019-061212

(51) Int. Cl.
*H02K 1/276* (2022.01)
*F25B 31/02* (2006.01)
(Continued)

(52) U.S. Cl.
CPC ........... *H02K 1/276* (2013.01); *F25B 31/026* (2013.01); *H02K 1/32* (2013.01); *H02K 21/14* (2013.01)

(58) Field of Classification Search
CPC .......... H02K 1/27; H02K 1/274; H02K 1/276; H02K 1/2706; H02K 1/2753;
(Continued)

(56) References Cited

U.S. PATENT DOCUMENTS

2006/0186752 A1 8/2006 Matsumoto et al.
2009/0015090 A1* 1/2009 Kimura .................. H02K 1/276
310/156.08
(Continued)

FOREIGN PATENT DOCUMENTS

JP 2002-345188 A 11/2002
JP 2006-238584 A 9/2006
(Continued)

OTHER PUBLICATIONS

WO 2017171061 A1_ Translation (Year: 2023).*
(Continued)

*Primary Examiner* — Christopher M Koehler
*Assistant Examiner* — Ahmed F Seck
(74) *Attorney, Agent, or Firm* — Spencer Fane LLP

(57) ABSTRACT

An electric motor includes a stator, and a rotor having a plurality of magnetic poles. Each magnetic pole includes a rotor core having through holes arranged circumferentially side by side, and a permanent magnet inserted into each through hole. A length of a portion of the rotor core in a radial direction of the rotor is shorter than a length of the permanent magnet in the radial direction of the rotor. The length of the portion of the rotor core is measured between an inner surface of each of the through holes adjacent to an outer periphery of the rotor and an outer peripheral surface of the rotor. The permanent magnets generate a magnetic flux in a magnetic circuit showing a smaller magnetic resistance in a portion of the rotor radially outward of the permanent magnets than in a portion of the rotor radially inward of the permanent magnets.

16 Claims, 7 Drawing Sheets

(51) Int. Cl.
    *H02K 1/32*         (2006.01)
    *H02K 21/14*       (2006.01)

(58) Field of Classification Search
    CPC .. H02K 1/2766; H02K 1/2789; H02K 1/2795;
                H02K 1/32; H02K 9/19; H02K 9/193;
                          H02K 9/197; H02K 9/20
    USPC ....... 310/156.01, 156.36, 156.32, 156.57, 61
    See application file for complete search history.

(56) References Cited

U.S. PATENT DOCUMENTS

| | | | |
|---|---|---|---|
| 2009/0045689 A1 | 2/2009 | Haruno et al. | |
| 2016/0261158 A1* | 9/2016 | Horii | H02K 1/274 |
| 2016/0359384 A1* | 12/2016 | Okamoto | H02K 1/27 |
| 2017/0353067 A1* | 12/2017 | Yamamoto | H02K 1/276 |
| 2018/0091011 A1* | 3/2018 | Higashino | H02K 1/2766 |

FOREIGN PATENT DOCUMENTS

| | | | | |
|---|---|---|---|---|
| JP | 2008-219992 A | 9/2008 | | |
| JP | 2009-232535 A | 10/2009 | | |
| JP | 2009-247131 A | 10/2009 | | |
| JP | WO 2017171061 A1 * | 10/2017 | ............. | H02K 1/274 |
| WO | WO2019097603 A1 * | 5/2019 | ............. | H02K 1/276 |

OTHER PUBLICATIONS

WO2019097603A1—Translation (Year: 2024).*
International Preliminary Report of corresponding PCT Application
No. PCT/JP2020/012123 dated Oct. 7, 2021.
International Search Report of corresponding PCT Application No.
PCT/JP2020/012123 dated Jun. 23, 2020.
Search Report of corresponding EP Application No. 20 77 9838.0
dated Jan. 28, 2022.

\* cited by examiner

ELECTRIC MOTOR

CROSS-REFERENCE TO RELATED APPLICATIONS

This is a continuation of International Application No. PCT/JP2020/012123 filed on Mar. 18, 2020, which claims priority to Japanese Patent Application No. 2019-061212, filed on Mar. 27, 2019. The entire disclosures of these applications are incorporated by reference herein.

BACKGROUND

Field of Invention

The present disclosure relates to an electric motor.

Background Information

A rotor that includes a rotor core having holes and permanent magnets inserted in the holes has been known in the art (for example, Japanese Unexamined Patent Publication No. 2006-238584). According to the document, the permanent magnets are held in the rotor by a resin injected into a gap between a wall surface of each hole and the corresponding permanent magnet.

SUMMARY

A first aspect of the present disclosure is directed to an electric motor including a stator, and a rotor having a plurality of magnetic poles. Each of the magnetic poles of the rotor includes a rotor core having two or more through holes arranged side by side in a circumferential direction of the rotor, and a permanent magnet inserted into each of the through holes. A length of a portion of the rotor core in a radial direction of the rotor is shorter than a length of the permanent magnet in the radial direction of the rotor. The length of the portion of the rotor core is measured between an inner surface of each of the through holes adjacent to an outer periphery of the rotor and an outer peripheral surface of the rotor. The permanent magnets generate a magnetic flux in a magnetic circuit. The magnetic circuit shows a smaller magnetic resistance in a portion of the rotor radially outward of the permanent magnets than in a portion of the rotor radially inward of the permanent magnets.

DETAILED DESCRIPTION OF EMBODIMENT(S)

First Embodiment

A first embodiment will be described below. An electric motor (10) of the present embodiment is a bearingless motor. In the following description, a portion of a rotor (30) close to its axis (O) will be referred to as a "radially inward" portion or a portion "close to the inner periphery of the rotor," and a portion of the rotor (30) remote from its axis (O) will be referred to as a "radially outward" portion or a portion "close to the outer periphery of the rotor." A direction along the axis (O) of the rotor (30) will be referred to as an "axial direction" or an "axial direction of the rotor," and a direction orthogonal to the axis (O) of the rotor (30) will be referred to as a "radial direction" or a "radial direction of the rotor." A circumferential direction with reference to the axis (O) of the rotor (30) will be referred to as a "circumferential direction" or a "circumferential direction of the rotor."

Figure 1:
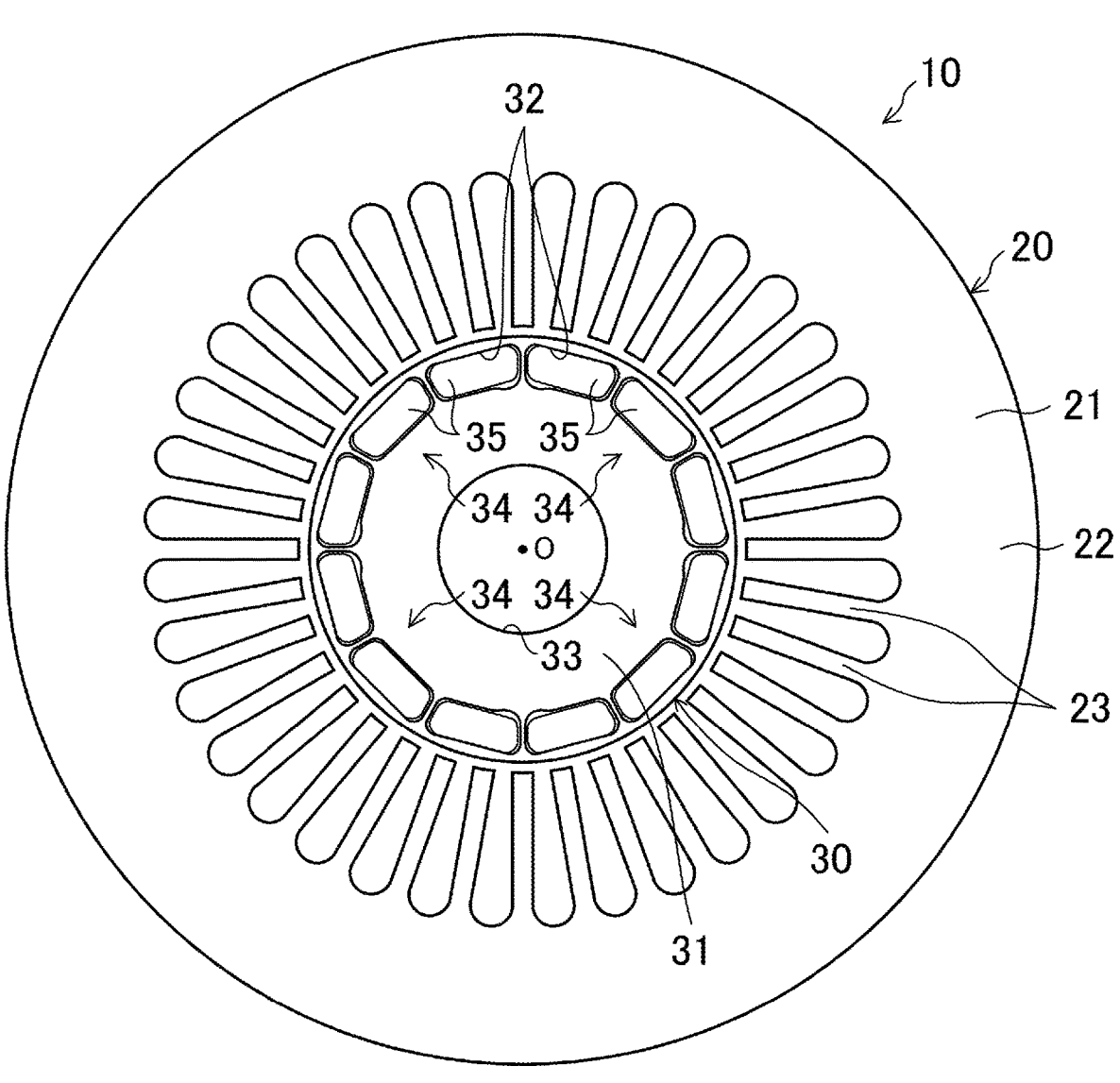
FIG. 1 is a front view of an electric motor according to a first embodiment.
Figure 2:
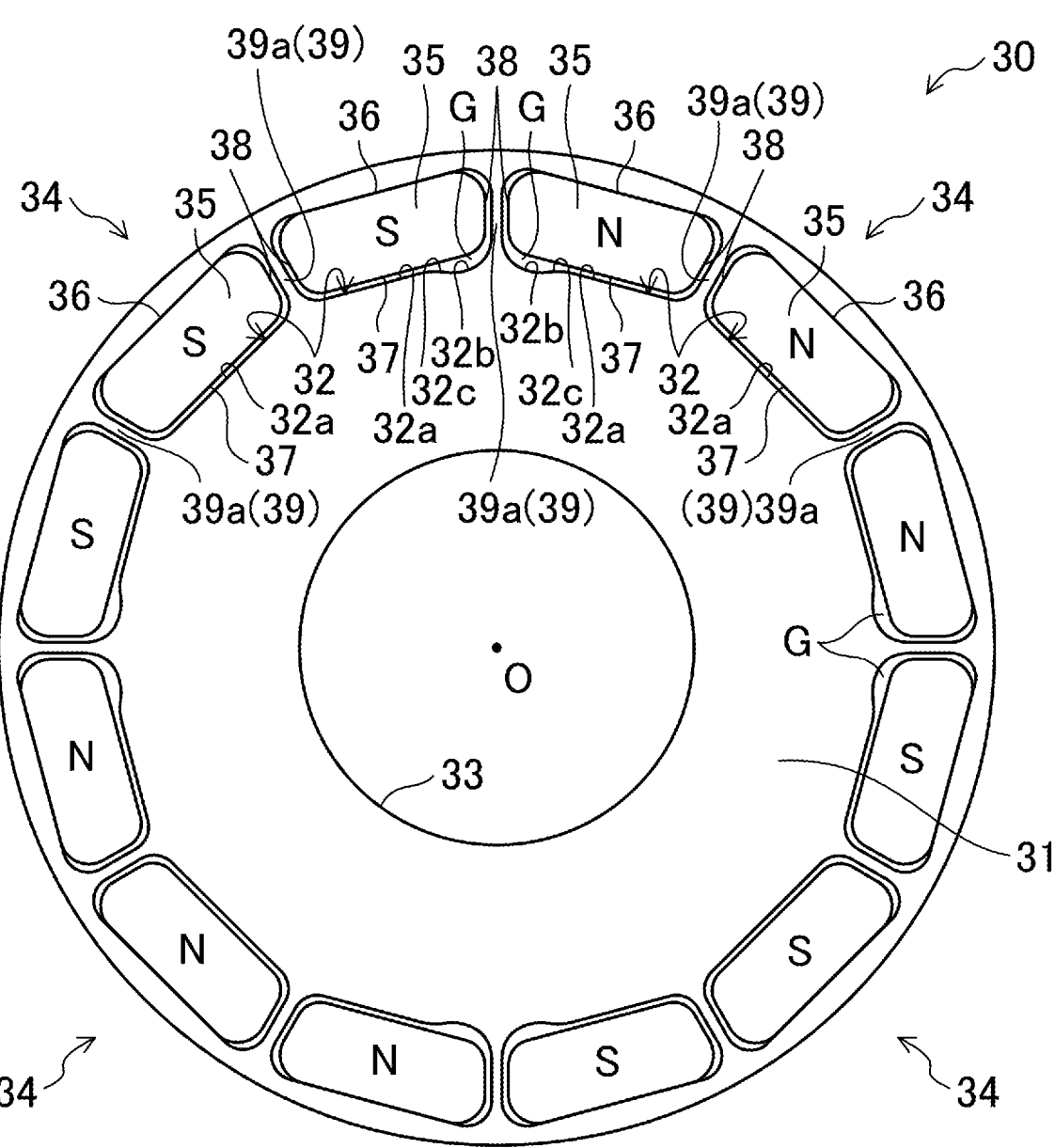
FIG. 2 is a front view of a rotor according to the first embodiment.

As illustrated in FIGS. 1 and 2, the electric motor (10) includes a stator (20) and a rotor (30).

The stator (20) includes a stator core (21), a driving coil (not shown), and a supporting coil (not shown).

The stator core (21) is a tubular member made of a magnetic material. The stator core (21) includes a substantially cylindrical back yoke (22) which is a radially outward portion of the stator core (21), and a plurality of teeth (23) protruding radially inward from an inner peripheral surface of the back yoke (22).

The driving coil allows driving current for rotating the rotor (30) to flow through the coil. The driving coil is wound around each of the teeth (23) by distributed winding. The driving coil may be wound around each of the teeth (23) by concentrated winding.

The supporting coil allows supporting current for supporting the rotor (30) in a non-contact manner to flow through the coil. The supporting coil is wound around each of the teeth (23) by distributed winding. The supporting coil may be wound around each of the teeth (23) by concentrated winding.

The rotor (30) is a buried permanent magnet (BPM) rotor. The rotor (30) is disposed radially inside the stator (20) to face the stator (20) with an air gap interposed therebetween. The rotor (30) includes a rotor core (31) and permanent magnets (35).

The rotor core (31) is a tubular member made of a magnetic material. The rotor core (31) has a plurality of through holes (32), 12 in this example, near an outer peripheral surface thereof. The through holes (32) are arranged side by side at substantially equal intervals in the circumferential direction of the rotor. The through holes (32) penetrate the rotor core (31) in the axial direction of the rotor. The rotor core (31) has, at its center, a shaft hole (33) in which a shaft (not shown) is inserted.

The rotor core (31) includes ribs (39) each provided between a pair of through holes (32) adjacent to each other in the circumferential direction of the rotor. Each rib (39) has an elongated shape extending in the radial direction of the rotor when viewed in the axial direction of the rotor. Each rib (39) includes a constant width portion (39a) having a constant width and extending in the radial direction of the rotor.

The permanent magnets (35) are sintered magnets containing rare earth, but are not limited to the sintered magnets. Each permanent magnet (35) is inserted into an associated one of the through holes (32) of the rotor core (31). In this example, three adjacent ones of the permanent magnets (35) aligned in the circumferential direction of the rotor and the rotor core (31) around these permanent magnets (35) constitute one magnetic pole (34). Thus, the rotor (30) of this example includes four magnetic poles (34). In this example shown in FIG. 2, three adjacent ones of the permanent magnets (35) on the upper right constitute an N-pole, and another three adjacent ones on the lower left constitute another N-pole. Three adjacent ones of the permanent magnets (35) on the lower right constitute an S-pole, and another three adjacent ones on the upper left constitute another S-pole. In a preferred embodiment, the permanent magnets (35) have substantially the same shape. One magnetic pole (34) may include two or less, or four or more through holes (32) and permanent magnets (35).

As illustrated in FIG. 2, each permanent magnet (35) is formed in a slightly flat, trapezoidal shape as viewed in the axial direction of the rotor. One of outer surfaces of the permanent magnet (35) close to the outer periphery of the rotor is a first magnet surface (36) extending linearly along the circumferential direction of the rotor. Another one of the outer surfaces of the permanent magnet (35) close to the inner periphery of the rotor is a second magnet surface (37) extending linearly and parallel to the first magnet surface (36). The remaining outer surfaces at both ends of the permanent magnet (35) in the circumferential direction of the rotor are third magnet surfaces (38) extending linearly along the constant width portion (39a) of the rib (39). Only one of the two third magnet surfaces (38) may extend along the constant width portion (39a), or both may not extend along the constant width portion (39a).

The first magnet surface (36) is longer than the second magnet surface (37) in the circumferential direction of the rotor. The length of the permanent magnet (35) in the radial direction of the rotor, i.e., a distance between the first magnet surface (36) and the second magnet surface (37), is greater than the length of a portion of the rotor core (31) in the radial direction of the rotor between the inner surface of the through hole (32) close to the outer periphery of the rotor and the outer peripheral surface of the rotor (30), i.e., a distance between the first magnet surface (36) of the permanent magnet (35) and the outer peripheral surface of the rotor (30). The first magnet surface (36) and each third magnet surface (38) form a round corner. The second magnet surface (37) and each third magnet surface form a round corner.

Each of the through holes (32) at both ends of each magnetic pole (34) in the circumferential direction of the rotor has an adjacent portion (32a), a distant portion (32b), and a transition portion (32c) formed in one of inner surfaces of the through hole. In other words, the through hole (32) closest to the adjacent magnetic pole (34) of different polarity includes the adjacent portion (32a), the distant portion (32b), and the transition portion (32c) formed in one of its inner surfaces. In the present embodiment, the through hole (32) in the middle of each magnetic pole (34) in the circumferential direction of the rotor includes no distant portion (32b) and transition portion (32c) in its inner surface.

The adjacent portion (32a) is a portion extending linearly along the second magnet surface (37) of the corresponding permanent magnet (35). The adjacent portion (32a) extends parallel to the second magnet surface (37) of the permanent magnet (35). The adjacent portion (32a) is formed at a center portion in the circumferential direction of the rotor of one of the inner surfaces of the through hole (32) close to the inner periphery of the rotor.

The distant portion (32b) is a portion more distant from the second magnet surface (37) of the permanent magnet (35) than the adjacent portion (32a). The distant portion (32b) is constituted of a recess hollowed inward in the radial direction of the rotor. The distant portion (32b) is formed in the inner surface of the through hole (32) close to the inner periphery of the rotor at an end portion of the inner surface in the circumferential direction of the rotor. More specifically, the through hole (32) closest to the adjacent magnetic pole (34) of different polarity has the distant portion (32b) formed only at the end portion in the circumferential direction of the rotor adjacent to the magnetic pole (34) of different polarity.

The transition portion (32c) lies between the adjacent portion (32a) and the distant portion (32b). The transition portion (32c) is a portion extending obliquely with respect to the second magnet surface (37) of the permanent magnet (35) to connect the adjacent portion (32a) and the distant portion (32b).

Each permanent magnet (35) in the through hole (32) having the adjacent portion (32a) and the distant portion (32b) cannot move toward the inner periphery of the rotor beyond a position where the second magnet surface (37) abuts on the adjacent portion (32a) when viewed in the axial direction of the rotor. The first magnet surface (36) of the permanent magnet (35) and one of the inner surfaces of the through hole (32) close to the outer periphery of the rotor extend linearly along the circumferential direction of the rotor, and these surfaces have substantially the same shape. The second magnet surface (37) of the permanent magnet (35) and the inner surface of the through hole (32) close to the inner periphery of the rotor have different shapes, i.e., the former extends linearly, and the latter is curved.

A gap (G) is formed between the outer surfaces of the permanent magnet (35) and the inner surfaces of the corresponding through hole (32), and the gap (G) is significantly larger in a region near the distant portion (32b) than in other regions including a region near the adjacent portion (32a). Thus, when the through hole (32) having the adjacent portion (32a) and the distant portion (32b) is viewed in the axial direction of the rotor, the gap (G) has a larger average dimension in the radial direction of the rotor between the second magnet surface (37) of the permanent magnet (35) and the inner surface of the through hole (32) close to the inner periphery of the rotor than between the first magnet surface (36) of the permanent magnet (35) and the inner surface of the through hole (32) close to the outer periphery of the rotor.

The "average dimension in the radial direction of the rotor" of the gap (G) is, for example, a value expressed by $(G1 \times L1 + G2 \times L2)/(L1 + L2)$, where $L1$ represents the length of the adjacent portion (32a) in the circumferential direction of the rotor, $L2$ the length of the distant portion (32b) in the circumferential direction of the rotor, $G1$ the dimension of the gap (G) in the radial direction of the rotor near the adjacent portion (32a), $G2$ the dimension of the gap (G) in the radial direction of the rotor near the distant portion (32b), and $G1$ and $G2$ are constant values.

The magnetic resistance in the gap (G) decreases with the decrease in average dimension in the radial direction of the rotor of the gap (G) between the outer surface of the permanent magnet (35) and the inner surface of the through hole (32). Thus, a magnetic circuit in which the permanent magnets (35) generate a magnetic flux shows a smaller magnetic resistance in a portion of the rotor (30) radially outward of the permanent magnets (35) than in a portion of the rotor (30) radially inward of the permanent magnets (35).

The magnetic circuit may be, for example, a magnetic circuit in which the magnetic flux generated by the permanent magnets (35) constituting the N-pole passes through a portion of the rotor core (31) outward of the permanent magnets (35) in the radial direction of the rotor, the permanent magnets (35) constituting the S-pole, the distant portions (32b) corresponding to the permanent magnets (35) constituting the S-pole, a portion of the rotor core (31) inward of the permanent magnets (35) in the radial direction of the rotor, and the distant portions (32b) corresponding to the permanent magnets (35) constituting the N-pole.

Advantages of First Embodiment

The electric motor (10) of the present embodiment includes a stator (20), and a rotor (30) having a plurality of magnetic poles (34). Each of the magnetic poles (34) of the rotor (30) includes a rotor core (31) having two or more through holes (32) arranged side by side in a circumferential direction of the rotor, and a permanent magnet (35) inserted into each of the through holes (32). A length of a portion of the rotor core (31) in a radial direction of the rotor between an inner surface of each of the through holes (32) close to an outer periphery of the rotor and an outer peripheral surface of the rotor (30) is shorter than a length of the permanent magnet (35) in the radial direction of the rotor. A magnetic circuit in which the permanent magnets (35) generate a magnetic flux shows a smaller magnetic resistance in a portion of the rotor radially outward of the permanent magnets (35) than in a portion of the rotor radially inward of the permanent magnets (35). Thus, the magnetic circuit in which the permanent magnets (35) generate the magnetic flux in the rotor (30) shows a predetermined difference in magnetic resistance between a portion of the rotor radially outward of the permanent magnets (35) and a portion of the rotor radially inward of the permanent magnets (35). In accordance with such a difference in magnetic resistance, each permanent magnet (35) is attracted to the inner surface of the corresponding through hole (32) close to the outer periphery of the rotor by a magnetic force. A centrifugal force that acts on the permanent magnets (35) while the electric motor (10) is in operation also presses each permanent magnet (35) against the inner surface of the through hole (32) close to the outer periphery of the rotor. Both of the magnetic force and the centrifugal force act to position each permanent magnet (35) on the inner surface of the through hole close to the outer periphery of the rotor, making the permanent magnets (35) less likely to move in the through holes (32) when the electric motor (10) is in operation. This structure can suitably hold the permanent magnets (35) in the rotor (30), and can protect the permanent magnets (35) from damage caused by collision against the inner surfaces of the through holes (32).

When the electric motor (10) of the present embodiment is viewed in an axial direction of the rotor, the permanent magnets (35) and the through holes (32) are shaped to restrict a position of each of the permanent magnets (35) in the radial direction of the rotor using an adjacent portion (32a) so that an average dimension of a gap (G) in the radial direction of the rotor between an outer surface of the permanent magnet (35) and an inner surface of a corresponding one of the through holes (32) is smaller in a portion of the gap (G) close to the outer periphery of the rotor than in a portion of the gap (G) close to the inner periphery of the rotor, irrespective of the position of the permanent magnet (35) in the through hole (32). Such restriction of the position of each permanent magnet (35) in the radial direction of the rotor within a region of the through hole (32) where the permanent magnet (35) can be disposed achieves the predetermined difference in magnetic resistance described above. Specifically, the magnetic resistance in the gap (G) decreases with the decrease in average dimension in the radial direction of the rotor of the gap (G) between the outer surface of the permanent magnet (35) and the inner surface of the through hole (32). In the present embodiment, the gap (G) radially outward of the permanent magnet (35) has the smaller average dimension in the radial direction of the rotor than the gap (G) radially inward of the permanent magnet (35). This makes the magnetic resistance smaller in a portion of the rotor radially outward of the permanent magnet (35) than in a portion of the rotor radially inward of the permanent magnet (35).

In the electric motor (10) of the present embodiment, the inner surface of each of the through holes (32) close to the inner periphery of the rotor includes an adjacent portion (32a) formed along the outer surface of the corresponding one of the permanent magnets (35), and a distant portion (32b) that is more distant from the outer surface of the corresponding permanent magnet (35) than the adjacent portion (32a). The adjacent portion (32a) thus restricts the position of each permanent magnet (35) in the radial direction of the rotor. The gap (G) corresponding to the distant portion (32b) is larger than the gap (G) corresponding to the adjacent portion (32a). Thus, the distant portion (32b) increases the magnetic resistance in a portion of the rotor radially inward of the permanent magnet (35).

In the electric motor (10) of the present embodiment, the distant portion (32b) is provided only at an end portion of each through hole (32) in the circumferential direction of the rotor. Thus, the distance between the permanent magnet (35) and the rotor core (31) increases at the end portion of the through hole (32) in the circumferential direction of the rotor. This can reduce the radius of curvature of the corner of the permanent magnet (35) close to the inner periphery of the rotor, and thus can increase the torque of the electric motor (10) and the demagnetization resistance of the permanent magnet (35). Further, the magnetic flux decreases around the root of each rib (39) close to the inner periphery of the rotor, alleviating the magnetic saturation in this region. This allows the magnetic flux to easily flow through the ribs (39). This can increase the reluctance torque and supporting force of the electric motor (10).

In the electric motor (10) of the present embodiment, each of the magnetic poles (34) having the through holes (32) has three through holes (32), and the through hole (32) closest to the adjacent magnetic pole (34) of different polarity has the distant portion (32b) provided only at an end portion of the through hole (32) in the circumferential direction of the rotor, the end portion being adjacent to the magnetic pole (34) of different polarity. In other words, the distant portion (32b) is selectively provided at a position where the permanent magnets (35) of different polarities attracted to each other tend to be attracted to the inner surfaces of the through holes (32) close to the inner periphery of the rotor. This structure can advantageously hold the permanent magnets (35) in a suitable manner, and can reduce an increase in the magnetic resistance in the rotor (30).

In the electric motor (10) of the present embodiment, each of the magnetic poles (34) having the through holes (32) has three through holes (32), and the through hole (32) closest to the adjacent magnetic pole (34) of different polarity has the distant portion (32b). In other words, the distant portion (32b) is provided only at a position where the permanent magnets (35) of different polarities attracted to each other tend to be attracted to the inner surfaces of the through holes (32) close to the inner periphery of the rotor. This structure can advantageously hold the permanent magnets (35) in a suitable manner, and can reduce an increase in the magnetic resistance in the rotor (30).

The rotor core (31) of the electric motor (10) of the present embodiment has a rib (39) formed between the through holes (32) adjacent to each other in the circumferential direction of the rotor, the rib (39) including a constant width portion (39a) having a constant width and extending in the radial direction of the rotor. One or both of outer surfaces at both ends of each of the permanent magnets (35) in the circumferential direction of the rotor extend along the constant width portion (39a) of the rib (39). Thus, each permanent magnet (35) has a greater dimension in the radial direction of the rotor in a wide range in the circumferential direction of the rotor. This allows the permanent magnets (35) to generate more magnetic flux, and can increase the supporting force and torque of the electric motor (10).

Second Embodiment

A second embodiment will be described below. An electric motor (10) of the present embodiment is different from that of the first embodiment in the configuration of the through holes (32). The following description will mainly focus on the differences from the first embodiment.

Figure 3:
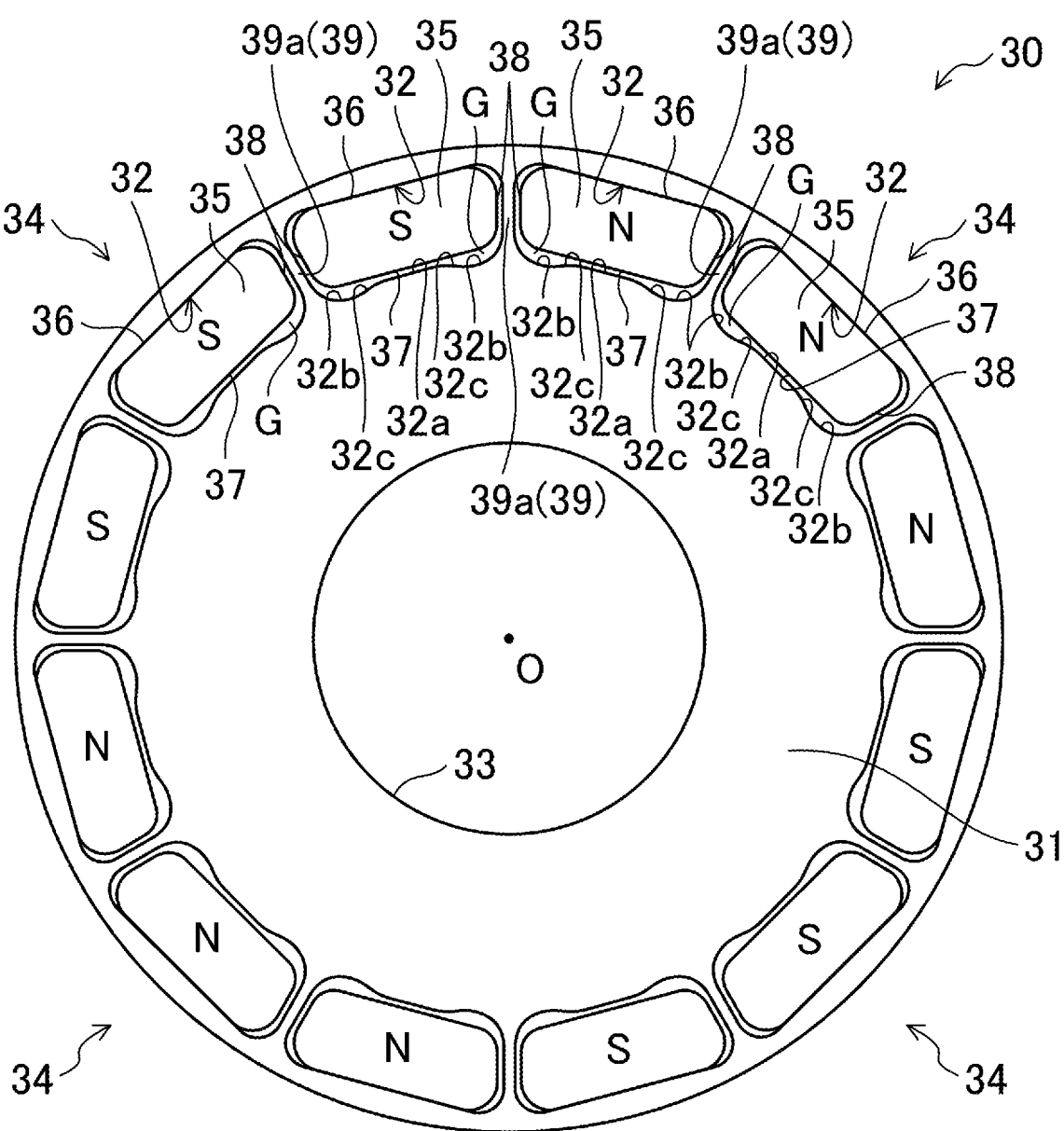
FIG. 3 is a front view of a rotor according to a second embodiment.

As illustrated in FIG. 3, each of the through holes (32) has an adjacent portion (32a), distant portions (32b), and transition portions (32c). All the through holes (32) have substantially the same shape.

Each through hole (32) has one adjacent portion (32a), two distant portions (32b), and two transition portions (32c). The adjacent portion (32a) is formed at a center portion of the through hole (32) in the circumferential direction of the rotor. Each of the two distant portions (32b) is formed at the corresponding one of the ends of the through hole (32) in the circumferential direction of the rotor. Each transition portion (32c) lies between the adjacent portion (32a) and the distant portion (32b).

Advantages of Second Embodiment

The electric motor (10) of the present embodiment achieves the same advantages as those of the first embodiment.

Third Embodiment

A third embodiment will be described below. An electric motor (10) of the present embodiment is different from that of the first embodiment in the configuration of the through holes (32). The following description will mainly focus on the differences from the first embodiment.

Figure 4:
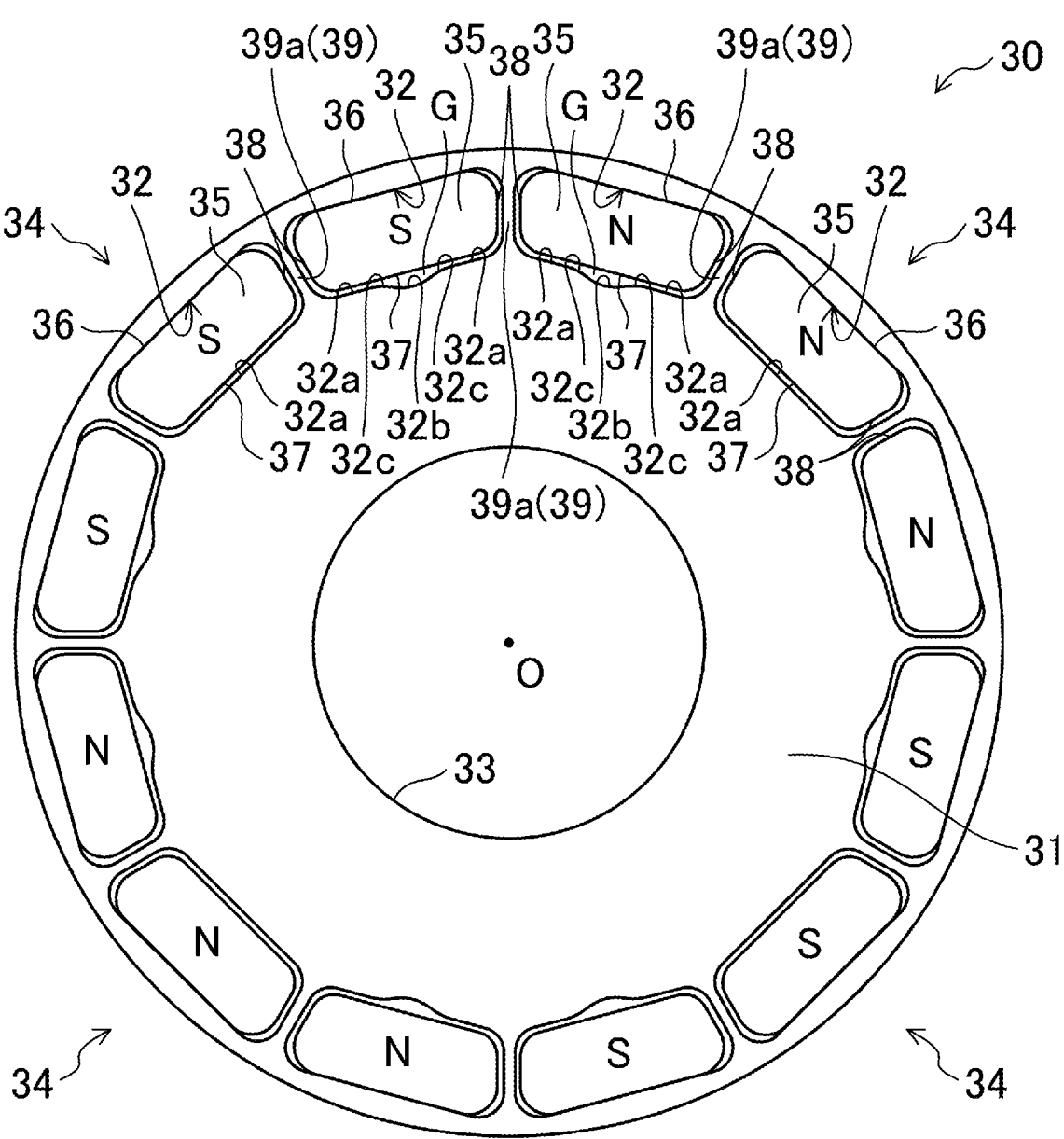
FIG. 4 is a front view of a rotor according to a third embodiment.

As illustrated in FIG. 4, each of the through holes (32) at both ends of the corresponding magnetic pole (34) in the circumferential direction of the rotor has two adjacent portions (32a) and one distant portion (32b). The two adjacent portions (32a) are formed at both ends of the through hole (32) in the circumferential direction of the rotor. The distant portion (32b) is formed at a center portion of the through hole (32) in the circumferential direction of the rotor.

Advantages of Third Embodiment

The electric motor (10) of the present embodiment achieves the same advantages as those of the first embodiment.

In the electric motor (10) of the present embodiment, the distant portion (32b) is provided only at a center portion of the through hole (32) in the circumferential direction of the rotor. Thus, the rib (39) can be shortened in the radial direction of the rotor, and thus can be more resistant to the centrifugal force generated while the electric motor (10) is in operation.

Fourth Embodiment

A fourth embodiment will be described below. An electric motor (10) of the present embodiment is different from that of the first embodiment in the configuration of the permanent magnets (35) and the through holes (32). The following description will mainly focus on the differences from the first embodiment.

Figure 5:
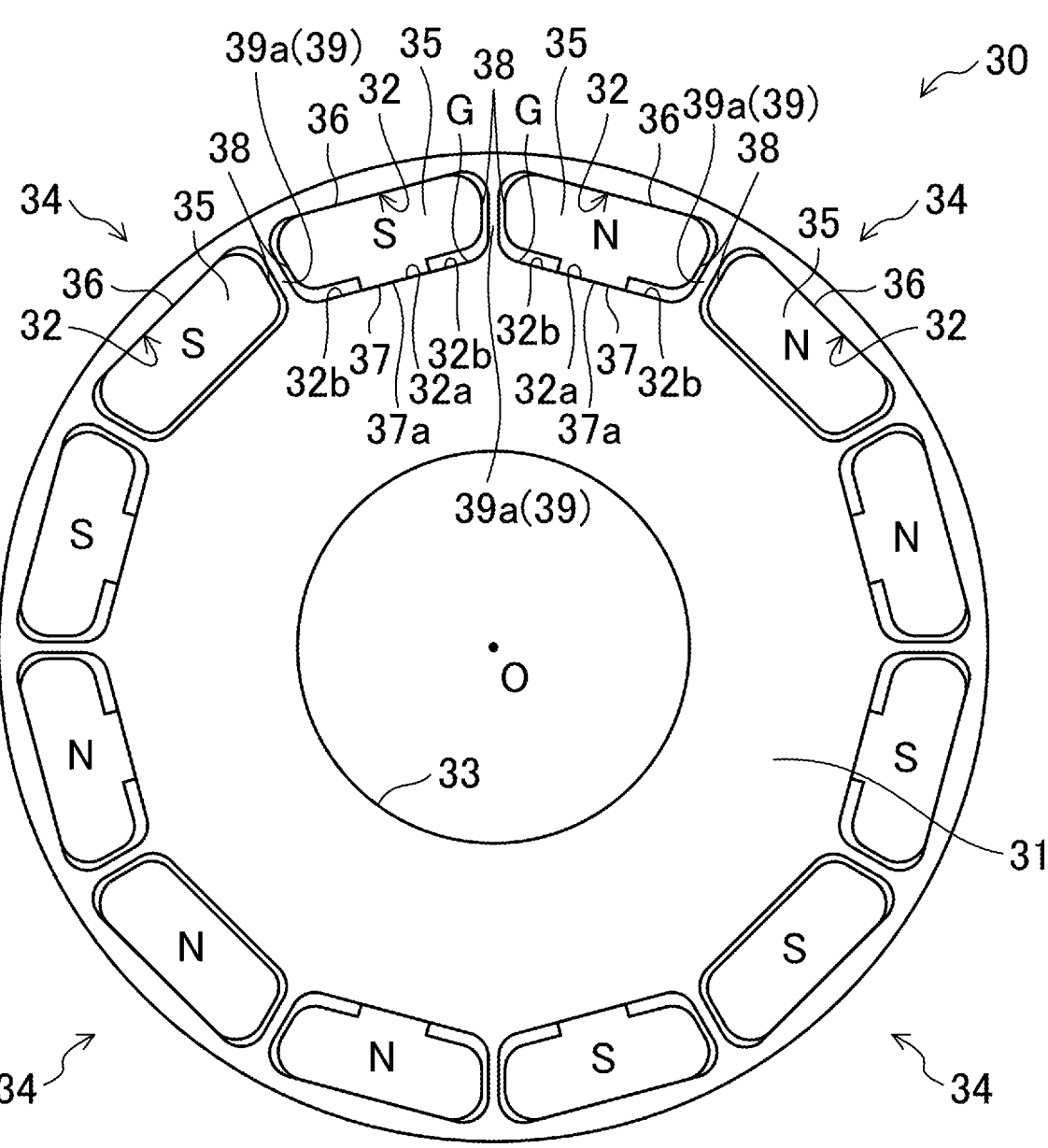
FIG. 5 is a front view of a rotor according to a fourth embodiment.

As illustrated in FIG. 5, each of the permanent magnets (35) at both ends of the corresponding magnetic pole (34) in the circumferential direction of the rotor has a protrusion (37a) protruding from a center of a second magnet surface (37) toward the inner periphery of the rotor. One of the inner surfaces of each through hole (32) receiving the permanent magnet (35) close to the inner periphery of the rotor extends linearly along the circumferential direction of the rotor. The inner surface of the through hole (32) close to the inner periphery of the rotor includes an adjacent portion (32a) facing the protrusion (37a) of the permanent magnet (35), and distant portions (32b) on both sides of the adjacent portion (32a). The protrusion (37a) may be formed at any position on the second magnet surface (37).

Advantages of Fourth Embodiment

The electric motor (10) of the present embodiment achieves the same advantages as those of the first embodiment.

In the electric motor (10) of the present embodiment, the outer surface of the permanent magnet (35) close to the inner periphery of the rotor has the protrusion (37a) protruding toward the inner periphery of the rotor. A portion of the through hole (32) facing the protrusion (37a) constitutes the adjacent portion (32a), and portions of the through hole (32) next to the adjacent portion (32a) constitute the distant portions (32b).

Fifth Embodiment

A fifth embodiment will be described below. An electric motor (10) of the present embodiment is a variation of that of the second embodiment, and is different from the motors of the above embodiments in that the motor has a structure for cooling the permanent magnets (35). The following description will mainly focus on the differences from the second embodiment.

Figure 6:
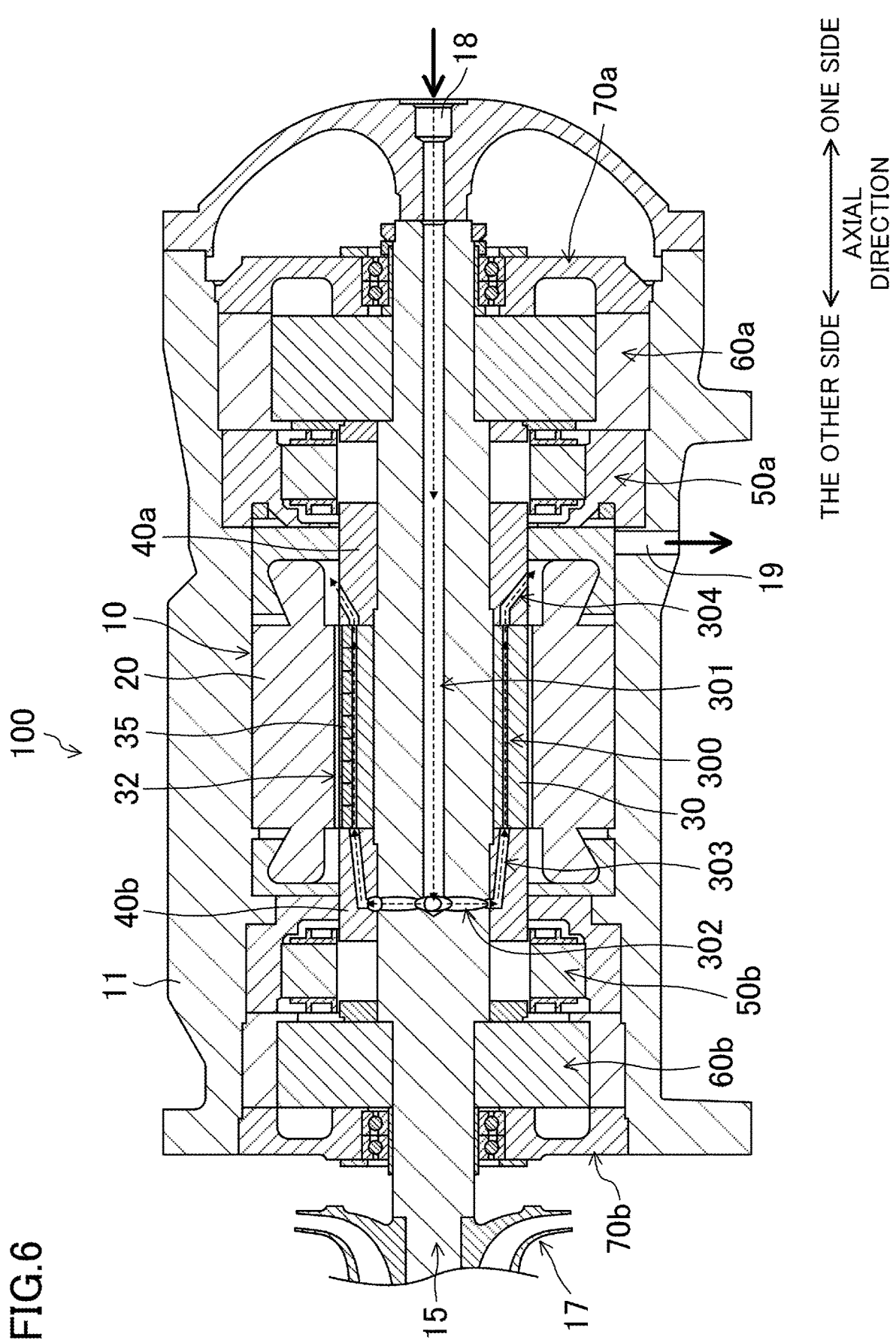
FIG. 6 is a longitudinal sectional view of a centrifugal compressor including an electric motor according to a fifth embodiment.

A centrifugal compressor (100) including the electric motor (10) of the present embodiment will be schematically described below. As illustrated in FIG. 6, the centrifugal compressor (100) includes a casing (11), an electric motor (10), a shaft portion (15), an impeller (17), a first spacer (40a), a second spacer (40b), a first radial magnetic bearing (50a), a second radial magnetic bearing (50b), a first thrust magnetic bearing (60a), a second thrust magnetic bearing (60b), a first touchdown bearing (70a), a second touchdown bearing (70b), and an inflow port (18).

The casing (11) is a tubular member that houses other members of the centrifugal compressor (100). The casing (11) extends in an axial direction. A stator (20) of the electric motor (10) is fixed to an inner peripheral wall of the casing (11). The rotor (30) is disposed radially inward of the stator (20).

The shaft portion (15) is coaxially fixed to the inside of the rotor (30) in the radial direction of the rotor. The shaft portion (15) corresponds to the shaft described above. The shaft portion (15) extends in the axial direction. Both axial ends of the shaft portion (15) protrude outward from the casing (11). The inflow port (18) is connected to one of the axial ends of the shaft portion (15). An impeller (17) is fixed to the other axial end of the shaft portion (15).

The first spacer (40a) is located on one side in the axial direction with respect to the rotor (30). The first spacer (40a) has a cylindrical shape. An inner peripheral surface of the first spacer (40a) is fixed to an outer peripheral surface of the shaft portion (15). The second spacer (40b) is located on the other side in the axial direction with respect to the rotor (30). The second spacer (40b) has a cylindrical shape. An inner peripheral surface of the second spacer (40b) is fixed to the outer peripheral surface of the shaft portion (15).

The first radial magnetic bearing (50a) is located on one side in the axial direction with respect to the first spacer (40a). The first radial magnetic bearing (50a) rotatably supports the shaft portion (15) with respect to the casing (11) by magnetic levitation. The second radial magnetic bearing (50b) is located on the other side in the axial direction with respect to the second spacer (40b). The second radial magnetic bearing (50b) rotatably supports the shaft portion (15) with respect to the casing (11) by magnetic levitation.

The first thrust magnetic bearing (60a) is located on one side in the axial direction with respect to the first radial magnetic bearing (50a). The first thrust magnetic bearing (60a) pulls the shaft portion (15) toward the other side in the axial direction by magnetic force. The second thrust magnetic bearing (60b) is located on the other side in the axial direction with respect to the second radial magnetic bearing (50b). The second thrust magnetic bearing (60b) pulls the shaft portion (15) toward the one side in the axial direction by magnetic force. The magnetic force of the first thrust magnetic bearing (60a) and the magnetic force of the second thrust magnetic bearing (60b) cancel a thrust load on the shaft portion (15). The thrust load on the shaft portion (15) is applied as a result of an increase in the number of rotations of the impeller (17).

The first touchdown bearing (70a) is located on one side in the axial direction with respect to the first thrust magnetic bearing (60a). The second touchdown bearing (70b) is located on the other side in the axial direction with respect to the second thrust magnetic bearing (60b). The first touchdown bearing (70a) and the second touchdown bearing (70b) function as bearings only when the centrifugal compressor (100) is uncontrollable due to some trouble. This can protect the magnetic bearings (50, 60) and the rotating members.

Figure 7:
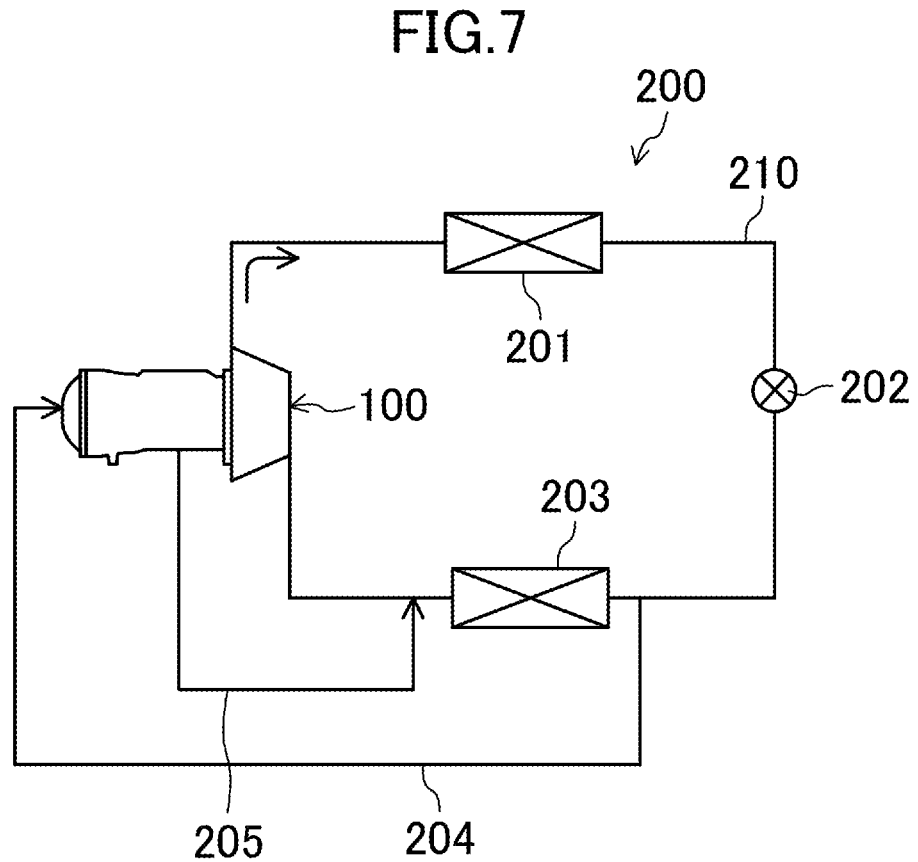
FIG. 7 is a schematic view of a refrigeration apparatus equipped with a centrifugal compressor according to the fifth embodiment.

The centrifugal compressor (100) is mounted on a refrigeration apparatus (200) shown in FIG. 7. The refrigeration apparatus (200) includes a refrigerant circuit (210) filled with a refrigerant. The refrigerant circuit (210) includes the centrifugal compressor (100), a condenser (201), an expansion valve (202), and an evaporator (203).

The rotation of the impeller (17) causes the centrifugal compressor (100) to compress the refrigerant that has flowed into an impeller chamber housing the impeller (17). The refrigerant compressed by the centrifugal compressor (100) dissipates heat to the air to condense in the condenser (201). The refrigerant condensed in the condenser (201) is decompressed through the expansion valve (202). The refrigerant decompressed through the expansion valve (202) absorbs heat from the air to evaporate in the evaporator (203). The centrifugal compressor (100) recompresses the refrigerant evaporated in the evaporator (203).

The refrigerant circuit (210) is connected to an upstream branch path (204) and a downstream branch path (205). One end of the upstream branch path (204) is connected to a portion between the expansion valve (202) and the evaporator (203). The other end of the upstream branch path (204) is connected to an inflow end of the refrigerant flow path (300) of the centrifugal compressor (100). One end of the downstream branch path (205) is connected to an outflow end of the refrigerant flow path (300).

A portion of the refrigerant just upstream of the evaporator (203) is supplied to the outer peripheral surface of the permanent magnets (35) via the upstream branch path (204) and the refrigerant flow path (300) provided in the centrifugal compressor (100). The refrigerant flow path (300) will be described in detail below with reference to FIG. 6.

The refrigerant flow path (300) includes a first flow path (301), second flow paths (302), third flow paths (303), and fourth flow paths (304).

The first flow path (301) is formed in the shaft portion (15). The first flow path (301) extends from one of end faces of the shaft portion (15) on one side in the axial direction toward the other side. One of axial ends of the first flow path (301) is connected to the inflow port (18). The other axial end of the first flow path is located in the middle of the shaft portion (15) in the axial direction.

Each second flow path (302) is formed across the shaft portion (15) and the second spacer (40b). The second flow path (302) extends radially outward from the other axial end of the first flow path (301). A radially outer end of the second flow path opens inside the second spacer (40b). The second flow paths (302), four in the present embodiment, are provided at intervals in the circumferential direction.

The third flow paths (303), four in the present embodiment, are formed in the second spacer (40b). The third flow paths (303) are provided so as to correspond to the second flow paths (302). Specifically, an end on the other side in the axial direction of each third flow path (303) is connected to the radially outer end of the corresponding second flow path (302). The third flow paths (303) are inclined with respect to the axial direction. Specifically, each third flow path (303) extends to be gradually away from the shaft portion (15) toward the one side in the axial direction. A distance from the one axial end of the third flow path (303) to the shaft portion (15) is substantially equal to a distance from the permanent magnet (35) to the shaft portion (15). That is, the third flow paths (303) are connected to the through holes (32). The third flow paths (303) may communicate with all or only some of the through holes (32).

The fourth flow paths (304), four in the present embodiment, are formed in the first spacer (40a). Each fourth flow path (304) extends from one axial end of the through hole (32) toward the one side in the axial direction. The fourth flow paths (304) are inclined with respect to the axial direction. Specifically, each fourth flow path (304) extends to be gradually away from the shaft portion (15) toward the one side in the axial direction. An end of each fourth flow path (304) on the one side in the axial direction is connected to the outer peripheral surface of the first spacer (40a). The end of each fourth flow path (304) on the one side in the axial direction is connected, via a space in the casing (11), to an outflow port (19) connecting the inside and outside of the casing (11).

When the centrifugal compressor (100) configured as described above is driven and the entire refrigeration apparatus (200) is in operation, the refrigerant flows in the casing (11) as described below. Specifically, a portion of the refrigerant immediately before the supply to the evaporator (203) of the refrigerant circuit (210) flows into the first flow path (301) through the upstream branch path (204) and the inflow port (18). The refrigerant flows through the first flow path (301) toward the other side in the axial direction, and enters the second flow paths (302) from the first flow path (301). In each second flow path (302), centrifugal force acts on the refrigerant to cause the refrigerant to flow radially outward in the second flow path (302). Then, the refrigerant that has entered each third flow path (303) from the corresponding second flow path (302) goes toward the end of the third flow path (303) on one side in the axial direction under the centrifugal force. The refrigerant then flows from each third flow path (303) to the gap (G) in each through hole (32). The refrigerant flows through the gap (G) toward the one side in the axial direction along the through hole (32). In this process, the refrigerant takes heat of the permanent magnets (35). The refrigerant flowing through each gap (G) is a gas-liquid two-phase refrigerant having a high liquid ratio. Thus, the latent heat of evaporation of the refrigerant is used to cool the permanent magnets (35). After passing the through holes (32), the refrigerant flows through the fourth flow paths (304) and the outflow port (19) in this order, and is then supplied to the immediate downstream of the evaporator (203) via the downstream branch path (205).

Advantages of Fifth Embodiment

As described above, the electric motor (10) of the present embodiment is provided with a gap (G) formed between the outer surface of each permanent magnet (35) and the inner surface of the corresponding through hole (32). The electric motor (10) includes a refrigerant flow path (300) for supplying a refrigerant to the gap (G). Typically, the rotor (30) of the electric motor (10) of this kind easily generates heat due to eddy current. This heat, if conducted to the permanent magnets (35), may demagnetize the permanent magnets (35). However, this configuration can efficiently cool the permanent magnets (35) with the refrigerant while reducing the influence of thermal resistance of the rotor core and the influence of contact thermal resistance between the rotor core and the permanent magnets (35). In other words, the refrigerant in direct contact with the permanent magnets (35) can cool the permanent magnets (35) more effectively than a refrigerant that indirectly cools the permanent magnets through the rotor core or any other component.

The electric motor (10) of the present embodiment includes the shaft portion (15) fixed to the inside of the rotor (30) in the radial direction of the rotor. The refrigerant flow path (300) includes a first flow path (in-shaft flow path) (301) formed inside the shaft portion (15). This can achieve a configuration that supplies the refrigerant to the gap (G) between each permanent magnet (35) and the corresponding through hole (32), thereby effectively cooling the permanent magnets (35), while reducing the parts count.

Other Embodiments

The foregoing embodiments may also be configured as follows.

The rotor (30), which is a BPM rotor in each of the foregoing embodiments, may be, for example, a consequent pole rotor.

The driving coil and the supporting coil wound around the stator (20) in each of the foregoing embodiments may be replaced with a shared coil having the functions of both coils.

The electric motor (10) configured as a bearingless motor in each of the foregoing embodiments may be an electric motor having no magnetic levitation function.

In the fifth embodiment, the low-temperature and low-pressure refrigerant that has entered the casing (11) flows through the first flow path (301) toward the other side in the axial direction, flows back through the second flow paths (302) and the third flow paths (303), and passes the through holes (32) toward the one side in the axial direction. However, the present disclosure is not limited thereto, and the heat exchanger may be configured as described below, for example. Specifically, an end of the first flow path (301) on the other side in the axial direction is provided near the end face on one side in the axial direction of the rotor (30). Each second flow path (302) extends radially outward from the end of the first flow path (301) on the other side in the axial direction (downstream end). A radially outer end (downstream end) of each second flow path (302) is connected to an end of the through hole (32) on the one side in the axial direction. Also with this configuration, the refrigerant flows through the first flow path (301), the second flow paths (302), and the gaps (G) in the through holes (32) in this order. The refrigerant that has passed through each through hole (32) toward the other side in the axial direction flows radially outward under centrifugal force on the end face of the through hole (32) on the other side in the axial direction, and then flows into the gap between the rotor (30) and the stator (20). The refrigerant flows toward the one side in the axial direction through the gap between the rotor (30) and the stator (20).

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure.

As can be seen from the foregoing description, the present disclosure is useful for an electric motor.

The invention claimed is:

1. An electric motor comprising:
   a stator; and
   a rotor having a plurality of magnetic poles, each of the magnetic poles of the rotor including
      a rotor core having a plurality of through holes arranged side by side in a circumferential direction of the rotor, and
      a permanent magnet inserted into each of the through holes to form a gap between the permanent magnet and the through hole in which the permanent magnet is inserted,
   lengths of portions of the rotor core in a radial direction of the rotor being shorter than lengths of the permanent magnets in the radial direction of the rotor, the lengths of the portions of the rotor core being measured between an inner surface of each of the through holes adjacent to an outer periphery of the rotor and an outer peripheral surface of the rotor, and
   the permanent magnets generating a magnetic flux in a magnetic circuit, and the magnetic circuit showing a smaller magnetic resistance in a portion of the rotor radially outward of the permanent magnets than in a portion of the rotor radially inward of the permanent magnets, the plurality of magnetic poles including magnetic poles having polarities different from each other and being adjacent to each other, a first distance being measured between an outer surface of a radially inward portion of the permanent magnet and an inner surface of a radially inward portion of the through hole near a border of the magnetic poles adjacent to each other, a second distance being measured between an outer surface of a radially inward portion of the permanent magnet and an inner surface of a radially inward portion of the through hole in a center portion of the magnetic poles adjacent to each other, and the first distance being larger than the second distance, the magnets being positioned in the through holes such that the maximum dimension of circumferential portions of the gaps that circumferentially face each other near the border of the magnetic poles having polarities different from each other and adjacent to each other are smaller than the first distance, and a rib being provided between the permanent magnets adjacent to each other in the circumferential direction, the rib extending from the radially inner end of the permanent magnets to the radially outer end of the permanent magnets, and the width of the rib being generally constant.

2. The electric motor of claim 1, wherein when viewed along an axial direction of the rotor, the permanent magnets and the through holes are shaped to restrict a position of each of the permanent magnets in the radial direction of the rotor so that an average radial dimension of each gap is smaller in an outer portion of the gap adjacent to the outer periphery of the rotor than in an inner portion of the gap adjacent to the inner periphery of the rotor.

3. The electric motor of claim 2, wherein the inner surface of each of the through holes adjacent to the inner periphery of the rotor includes an adjacent portion formed along the outer surface of a corresponding one of the permanent magnets, and a distant portion that is more distant from the outer surface of the corresponding one of the permanent magnets than the adjacent portion.

4. The electric motor of claim 3, wherein the distant portion is provided only at an end portion of each of the through holes in a circumferential direction of the rotor.

5. The electric motor of claim 4, wherein each of the magnetic poles has at least two through holes, and the through hole closest to an adjacent magnetic pole of different polarity has the distant portion provided only at an end portion of the through hole in the circumferential direction of the rotor, the end portion being adjacent to the magnetic pole of different polarity.

6. The electric motor of claim 5, wherein each of the magnetic poles has at least three through holes, and the through hole closest to the adjacent magnetic pole of different polarity has the distant portion.

7. The electric motor of claim 5, wherein one or both outer surfaces at both ends of each of the permanent magnets in the circumferential direction of the rotor extend along the rib.

8. The electric motor of claim 4, wherein each of the magnetic poles has at least three through holes, and the through hole closest to an adjacent magnetic pole of different polarity has the distant portion.

9. The electric motor of claim 4, wherein one or both outer surfaces at both ends of each of the permanent magnets in the circumferential direction of the rotor extend along the rib.

10. The electric motor of claim 3, wherein each of the magnetic poles has at least three through holes, and the through hole closest to an adjacent magnetic pole of different polarity has the distant portion.

11. The electric motor of claim 10, wherein one or both outer surfaces at both ends of each of the permanent magnets in the circumferential direction of the rotor extend along the rib.

12. The electric motor of claim 3, wherein one or both outer surfaces at both ends of each of the permanent magnets in the circumferential direction of the rotor extend along the rib.

13. The electric motor of claim 2, wherein one or both outer surfaces at both ends of each of the permanent magnets in the circumferential direction of the rotor extend along the rib.

14. The electric motor of claim 1, wherein one or both outer surfaces at both ends of each of the permanent magnets in the circumferential direction of the rotor extend along the rib.

15. The electric motor of claim 1, further comprising:

a refrigerant flow path, when viewed along an axial direction of the rotor, the electric motor being provided with a gap formed between an outer surface of each of the permanent magnets and an inner surface of a corresponding one of the through holes, and the refrigerant flow path being configured to supply a refrigerant to the gap.

16. The electric motor of claim 15, further comprising a shaft portion fixed to an inside of the rotor in the radial direction of the rotor, the refrigerant flow path including an in-shaft flow path formed inside the shaft portion.

* * * * *